United States Patent Office 3,497,516
Patented Feb. 24, 1970

3,497,516
TETRAHYDROISOQUINOLINE COMPOUNDS
AND PREPARATION THEREOF
Kiyohiko Mashimo, Warabi-shi, Eisaku Yamato and Osamu Yamagata, Tokyo, Yoshio Iwazawa, Urawa-shi, and Sumio Kurihara, Osaka-shi, Japan, assignors to Tanabe Seiyaku Co., Ltd., Osaka, Japan, a corporation of Japan
No Drawing. Filed Sept. 15, 1966, Ser. No. 579,504
Claims priority, application Japan, Dec. 8, 1965, 40/75,820; June 9, 1966, 41/37,524; July 22, 1966, 41/48,282, 41/48,283
Int. Cl. C07d 33/00, 35/00, 39/00, 57/04
U.S. Cl. 260—286           11 Claims

ABSTRACT OF THE DISCLOSURE

A compound of the formula

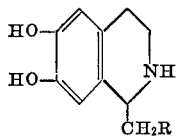

wherein R is dimethoxy phenyl, trimethoxyphenyl, or dimethoxy-monohydroxyphenyl, and a pharmaceutically acceptable acid addition salt of said compound.

---

This invention relates to new derivatives of 1-benzyl-6,7 - dihydroxy - 1,2,3,4-tetrahydro-isoquinoline and the process for preparing the same.

The derivatives are the compounds represented by the formula:

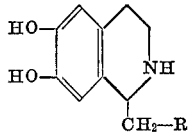

wherein R represents dimethoxyphenyl, trimethoxyphenyl or dimethoxy-monohydroxy-phenyl groups and the acid addition salts thereof.

We have found that the above new methoxy substituted derivatives of 1-benzyl-6,7-dihydroxy-1,2,3,4-tetrahydro-isoquinoline are useful as bronchodilators or cardiotonic agents.

For example, 1-(3,4,5-trimethoxybenzyl)-6,7-dihydroxy - 1,2,3,4 - tetrahydro-isoquinoline hydrochloride showed an excellent preventive and depressive effect for paroxysms caused by asthma as compared with isoproterenol sulfate [chemical name: 1-(3,4-dihydroxyphenyl)-2-isopropylamino-ethanol sulfate] which has been known as the most effective bronchodilator hitherto. Specifically, the compound showed the preventive effects of about 4, 5 and 10 times stronger, respectively, than isoproterenol sulfate. Each guinea pig inhaled 5% histamine spray or 5% acetylcholine spray after administration of the compounds being tested. The compounds were given orally, by subcutaneous injection, or by inhalation. The paroxysm of an adult man suffering from asthma was immediately depressed within one minute after inhalation of an aerosol solution containing 0.6% of the compound and the depressive effect was maintained for 3 hours. Duration of the depressive effect of the compound was more than twice that of isoproterenol sulfate.

1 - (3,4-dimethoxybenzyl)-6,7-dihydroxy-1,2,3,4-tetrahydroisoquinoline hydrochloride and 1-(3,5-dimethoxybenzyl)-6,7-dihydroxy-1,2,3,4-tetrahydro-isoquinoline hydrochloride also have similar bronchodilator activity of like duration, although their effectiveness is a little weaker than isoproterenol sulfate.

The cardiotonic actions of the compounds of this invention are also characterized by their long duration. For example, 1-(3,4,5-trimethoxybenzyl)-6,7-dihydroxy-1,2,3,4-tetrahydro-isoquinoline hydrochloride and 1-(3,5-dimethoxybenzyl) - 6,7 - dihydroxy-1,2,3,4-tetrahydro-isoquinoline hydrochloride showed cardiotonic activities of more than five times the duration of isoproterenol sulfate in pharmacological tests using dogs, although their effectiveness is weaker.

Auriculoventricular block and cardiac arrest of adult men encountered in cardiosurgery was successfully treated within several seconds by injecting intravenously 0.2–0.5 ml. of a solution containing 1 mg./ml. of 1-(3,4,5-trimethoxybenzyl) - 6,7 - dihydroxy-1,2,3,4-tetrahydro-isoquinoline hydrochloride accompanied by cardiac massage. 1 - (2,3,4-trimethoxybenzyl)-6,7-dihydroxy-1,2,3,4-tetrahydro-isoquinoline hydrochloride has also cardiotonic action, however, its bronchodilator action is exceptionally weak as compared to the above mentioned compounds.

Furthermore, the compounds of this invention have remarkably low toxicity. Namely, $LD_{50}$ of the compounds in mice, when the compounds were administered by subcutaneous injection, was calculated as more than 1,600 mg./kg., while $LD_{50}$ of isoproterenol sulfate was calculated at about 500 mg./kg. in the same test.

The process for preparing the above stated tetrahydroisoquinoline compounds may be illustrated by the following equations:

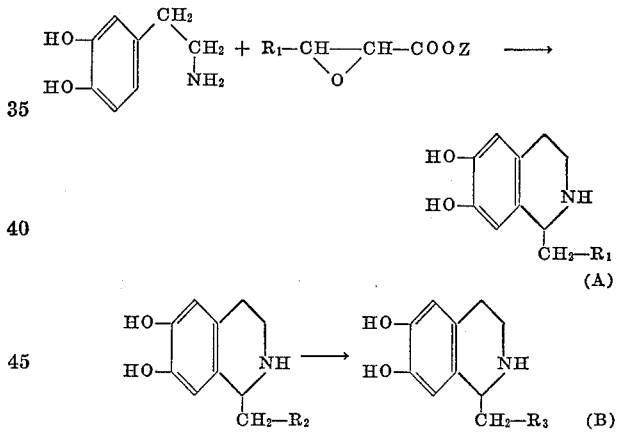

wherein $R_1$ represents dimethoxyphenyl or trimethoxyphenyl, $R_2$ represents trimethoxyphenyl, $R_3$ represents dimethoxy-monohydroxyphenyl and Z represents alkyl radical or alkali metal.

The condensation reaction (A) may be carried out by admixing 3,4-dihydroxy-phenethylamine, preferably in the form of its acid addition salt, and alkyl ester or alkali metal salt of the above stated phenylglycidic acid at an acid pH, preferably at a temperature of about 20° to 80° C. The reaction pH may be adjusted with a conventional acid such as hydrochloric acid, acetic acid, etc. It is preferable to react both reactants in an equimolar ratio by employing water, a water miscible organic solvent such as methanol, ethanol, propanol or a mixture thereof as the reaction solvent.

In the above acidic reaction, the glycidic acid compound turns into the corresponding aldehyde compound:

$$R_1\text{---}CH_2\text{---}CHO$$

wherein $R_1$ has the same meaning as stated above, and the aldehyde compound reacts with 3,4-dihydroxy-phenethylamine. Therefore, the above condensation reaction can be also carried out by employing the aldehyde compound itself instead of the glycidic acid compound.

Thus, 1-(34-dimethoxybenzyl)-6,7-dihydroxy - 1,2,3,4-tetrahydro-isoquinoline, 1 - (3,5 - dimethoxybenzyl)-6,7-dihydroxy - 1,2,3,4 - tetrahydro-isoquinoline, 1-(2,3,4-trimethoxybenzyl) - 6,7 - dihydroxy - 1,2,3,4-tetrahydro-isoquinoline and 1 - (3,4,5-trimethoxybenzyl)-6,7-dihydroxy-1,2,3,4-tetrahydro-isoquinoline, etc., can be prepared.

1 - (dimethoxy - mono - hydroxy - benzyl)-6,7-dihydroxy-1,2,3,4-tetrahydro-isoquinoline can be prepared by partially hydrolysing 1-trimethoxybenzyl-6,7-dihydroxy-1,2,3,4-tetrahydro-isoquinoline with mineral acid under moderate conditions. When hydrochloric acid is chosen as the hydrolysing agent, the partial hydrolysis is preferably carried out by heating at a temperature between about 90° and 120° C. for several hours under normal atmospheric pressure. If concentrated hydrobromic acid is chosen as the hydrolysing agent, the partial hydrolysis should be carried out at a temperature lower than 100° C. When sulfuric acid is chosen for this purpose, it is preferable to carry out the hydrolysis at 30°–40° C. The more extreme conditions results in the hydrolysis of all methoxy radicals.

EXAMPLE 1

4.7 g. of sodium 3-(3,4,5-trimethoxyphenyl)-glycidate and 2.8 g. of 3,4-dihydroxyphenethylamine hydrochloride were dissolved in 250 ml. of water. 7 ml. of 10% hydrochloric acid and 7 ml. of acetic acid were added to the solution and the solution was allowed to stand at 37° C. for 120 hours. After filtering off the resultant precipitate, the filtrate was decolored with activated carbon and was evaporated to remove water. The resultant crystals were separated and recrystallized twice from ethanol, whereby 0.25 g. of 1-(3,4,5-trimethoxybenzyl) - 6,7 - dihydroxy-1,2,3,4-tetrahydro-isoquinoline hydrochloride decomposing at 224.5–226° C. was obtained.

*Analysis.*—Calculated for $C_{19}H_{24}O_5NCl$: C, 59.76%; H, 6.34%; N, 3.67%; Cl, 9.28%. Found: C, 59.72%; H, 6.33%; N, 3.96%; Cl, 9.20%.

EXAMPLE 2

A solution of 5.7 g. of sodium 3-(3,5-dimethoxyphenyl)-glycidate in 270 ml. of water was added to a solution of 4 g. of 3,4-dihydroxyphenethylamine hydrochloride in 60 ml. of water. The mixture was adjusted to pH 2.6–2.8 by adding 2.3 ml. of 10% hydrochloric acid and 2.3 ml. of acetic acid, stirred for 96 hours at room temperature and concentrated under reduced pressure. The resultant crystals were collected by filtration whereby 2.5 g. of 1-(3,5-dimethoxybenzyl)-6,7-dihydroxy-1,2,3,4-tetrahydro-isoquinoline hydrochloride was obtained. The crystal was recrystallized from methanol-ether to give colorless prisms decomposing at 247.5–249° C.

*Analysis.*—Calculated for $C_{18}H_{22}NO_4Cl$: C, 61.55%; H, 6.31%; N, 3.99%; Cl, 10.09%. Found: C, 61.34%; H, 6.36%; N, 3.89%; Cl, 10.10%.

EXAMPLE 3

4.3 g. of sodium 3-(3,4-dimethoxyphenyl)-glycidate and 2.8 g. of 3,4 - dihydroxy-phenethylamine hydrochloride were treated as described in Example 1, whereby 0.30 g. of 1 - (3,4-dimethoxybenzyl)-6,7-dihydroxy-1,2,3,4-tetrahydro-isoquinoline hydrochloride was obtained. M.P. 275° C. (decomp.).

*Analysis.*—Calculated for $C_{18}H_{22}NO_4Cl$: C, 61.55%; H, 6.31%; N, 3.99%; Cl, 10.09%. Found: C, 60.91%; H, 6.15%; N, 4.06%; Cl, 10.22%.

EXAMPLE 4

A solution of 10.6 g. of sodium 3-(2,3,4-trimethoxyphenyl)-glycidate in 90 ml. of water was added to a solution of 6.3 g. of 3,4-dihydroxyphenethylamine hydrochloride in 400 ml. of water. The mixture was stirred at 30°–32° C. for 46 hours after adjusting pH to 3.8–4.0 with hydrochloric acid and acetic acid and was stirred for additional 24 hours after adjusting pH to 3.0–3.4 with the same acids. The precipitated resinous substance was filtered off and the filtrate was evaporated to remove water under reduced pressure. The residue was extracted with ethanol and ether was added to the ethanol solution. By rubbing the solution, 3.7 g. of 1-(2,3,4-trimethoxybenzyl) - 6,7 - dihydroxy-1,2,3,4-tetrahydro-isoquinoline hydrochloride was crystallized out. Colorless prisms of the compound decomposing at 199.5–201° C. were obtained after recrystallization from methanol-acetone-ether.

*Analysis.*—Calculated for $C_{19}H_{24}O_5NCl$: C, 59.76%; H, 6.34%; N, 3.67%; Cl, 9.28%. Found: C, 59.76%; H, 6.06%; N, 3.73%; Cl, 9.19%.

EXAMPLE 5

2.25 g. of 3,4-dihydroxyphenethylamine hydrochloride and 2.5 g. of 3,4,5-trimethoxyphenyl-acetoaldehyde were dissolved in a mixture of 15 ml. of methanol and 50 ml. of water. The solution was adjusted to pH 2.0–2.2 with hydrochloric acid and stirred at 25–30° C. for 21 hours. Then, the reaction mixture was evaporated to remove methanol, extracted with ether to remove water-insoluble substances, and evaporated to remove water. Thus, 2.7 g. of 1 - (3,4,5 - trimethoxybenzyl)-6,7-dihydroxy-1,2,3,4-tetrahydro-isoquinoline hydrochloride was obtained as crystals. M.P. 224.5–226° C. (decomp.) after recrystallization.

*Analysis.*—Calculated for $C_{19}H_{24}O_5NCl$: C, 59.76%; H, 6.34%; N, 3.67%; Cl, 9.28%. Found: C, 59.74%; H, 6.11%; N, 3.50%; Cl, 9.09%.

EXAMPLE 6

One g. of 1 - (3,4,5-trimethoxybenzyl)-6,7-dihydroxy-1,2,3,4-tetrahydro-isoquinoline hydrochloride was added to 35 ml. of concentrated hydrochloride acid and the mixture was refluxed for 4 hours. After cooling, the resultant crystals were collected by filtration, whereby 0.8 g. of 1 - (3,5-dimethoxy-4-hydroxy-benzyl)-6,7-dihydroxy-1,2,3,4-tetrahydro-isoquinoline hydrochloride melting at 245–247° C. (decomp.) was obtained. After recrystallization of the crystals from diluted hydrochloric acid, colorless powder melting at 248.5–249° C. decomp.) was obtained.

*Analysis.*—Calculated for $C_{18}H_{22}NO_5Cl$: C, 58.77%; H, 6.03%; Cl, 9.64%. Found: C, 58.97%; H, 5.69%; Cl, 9.61%.

We claim:

1. A compound represented by the formula:

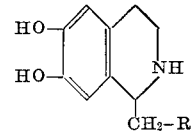

wherein R represents a group taken from the class consisting of dimethoxyphenyl, trimethoxyphenyl of dimethoxy-monohydroxy-phenyl groups or a pharmaceutically accepted acid addition salt thereof.

2. A compound according to claim 1 having the formula 1-(3,4-dimethoxy benzyl- 6,7-dihydroxy-1,2,3,4-tetrahydroisoquinoline hydrohalide.

3. A compound according to claim 1 having the formula 1-(3,5-dimethoxybenzyl-6,7-dihydroxy - 1,2,3,4-tetrahydroisoquinoline hydrohalide.

4. A compound according to claim 1 having the formula 1-(3,4,5-trimethoxy-benzyl)6,7-dihydroxy-1,2,3,4-tetrahydroisoquinoline hydrohalide.

5. A compound according to claim 1 having the formula 1 - (3,5 - dimethoxy-4-hydroxy-benzyl)-6,7-dihydroxy-1,2,3,4-tetrahydro-isoquinoline hydrohalide.

6. A compound according to claim 1 having the formula 1 - (2,34 - trimethoxy-benzyl)-6,7-dihydroxy-1,2,3,4-tetrahydroisoquinoline hydrohalide.

7. A compound according to claim 1 wherein said R is trimethoxy-phenyl.

8. A compound according to claim 1 wherein said R is dimethoxyphenyl.

9. A compound according to claim 1 of the formula

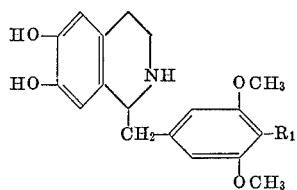

wherein $R_1$ is hydrogen, hydroxy or methoxy.

10. A compound according to claim 1 wherein R is trimethoxy.

11. A compound according to claim 1 wherein R is 3,4,5 - trimethoxyphenyl, 2,3,4 - trimethoxyphenyl, 3,4-dimethoxyphenyl, 3,5-dimethoxyphenyl or 3,5-dimethoxy-4-hydroxyphenyl.

References Cited
UNITED STATES PATENTS 3,238,212   3/1966   Brossi et al. _____ 260—289

OTHER REFERENCES

Leete et al.: The Incorporation of Dopamine into Chelidonine and Morphine, Tetrahedron Letters No. 3, pp. 147–151 (1964).

Noller: Chemistry of Organic Compounds, Saunders (1965) p. 856.

Späth et al.: Berichte, 63, pp. 2098–2102 (1930).

Yamoguchi et al.: Alkaloids of Menispermaceous Plants, C. A., 55, 5561 (1961).

ALEX MAZEL, Primary Examiner

A. M. T. TIGHE, Assistant Examiner

U.S. Cl. X.R.

260—289; 424—258

PO-1050 (5/69)

UNITED STATES PATENT OFFICE
CERTIFICATE OF CORRECTION

Patent No. 3,497,516          Dated February 24, 1970

Inventor(s) KIYOHIKO MASHIMO, et al.

It is certified that error appears in the above-identified patent and that said Letters Patent are hereby corrected as shown below:

Claim 1 - line 3 from bottom; cancel "of" (second occurrence) insert -- or --

SIGNED AND SEALED
DEC 15 1970

(SEAL)
Attest:

Edward M. Fletcher, Jr.
Attesting Officer

WILLIAM E. SCHUYLER, JR.
Commissioner of Patents